3,200,120
HYDRAZIDES OF 4-SUBSTITUTED
1-AMINOPIPERAZINES
Calvin H. Lovell, Morton Grove, Ill., assignor to G. D.
Searle & Co., Chicago, Ill., a corporation of Delaware
No Drawing. Filed Aug. 5, 1964, Ser. No. 387,765
11 Claims. (Cl. 260—268)

The present application is a continuation-in-part of application Serial No. 218,850, filed August 23, 1962, and now abandoned.

The present invention relates to a group of hydrazides of 4-substituted-1-aminopiperazines wherein the acid portion is derived from polycyclic acids. In particular, the present invention relates to a group of compounds having the following general formula

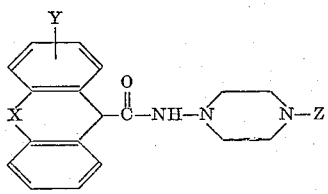

wherein X is selected from the group consisting of a bond connecting the two aromatic rings, an alkylene radical of less than three carbon atoms, and an element of periodic group VI of an atomic weight less than 40; Y is selected from the group consisting of hydrogen and halogen; and Z is selected from the group consisting of lower alkyl, hydroxy(lower alkyl), benzyl, ar-methylbenzyl, ar-methoxybenzyl, ar-halobenzyl, benzhydryl, and ar-halobenzhydryl.

The lower alkyl radicals referred to above contain up to 6 carbon atoms and are exemplified by radicals such as methyl, ethyl, propyl, and butyl. Likewise, the hydroxy (lower alkyl) radicals referred to above contain up to 6 carbon atoms. Examples of such radicals are 2-hydroxyethyl, 3-hydroxypropyl, and 4-hydroxybutyl. The halogen radicals referred to above include fluorine, chlorine, bromine, and iodine.

The symbol "ar" used as a prefix in a number of the substituents referred to above indicates that the substituent involved therein is attached to the aromatic portion of the group involved. Thus, ar-methylbenzyl would be exemplified by 2-methylbenzyl, 3-methylbenzyl, and 4-methylbenzyl.

The alkylene radicals referred to above are exemplified by methylene and ethylene. The elements of periodic group VI referred to above are O and S.

It should be obvious from the above discussion that the acid portion of the compounds of the present invention is based on acids such as fluorene-9-carboxylic acid, 9,10-dihydroanthracene-9-carboxylic acid, dibenzocycloheptadiene-5-carboxylic acid, xanthene-9-carboxylic acid, thioxanthene-9-carboxylic acid, and substituted variants thereof.

Also encompassed by this invention are the non-toxic salts of the aforementioned organic bases, as exemplified by the hydrochloride, hydrobromide, hydriodide, tartrate, succinate, maleate, malate, acetate, citrate, ascorbate, nitrate, sulfate, phosphate, and sulfamate.

The compounds of the present invention are conveniently prepared by heating the appropriate acid chloride with a 4-substituted-1-aminopiperazine. This reaction is preferably carried out in an inert solvent such as toluene or chloroform, although other inert solvents are equally suitable.

The 4-substituted 1-aminopiperazines are conveniently prepared by reduction, preferably with lithium aluminum hydride, of the corresponding 4-substituted 1-nitrosopiperazine. The nitroso compound is available either from nitrosation of the appropriate 1-substituted piperazine or from alkylation of 1-nitrosopiperazine with an alkyl halide, a benzyl halide, or a benzhydryl halide. Compounds such as benzyl chloride or benzhydryl chloride are preferred for the alkylation.

The compounds of this invention are useful because of their pharmacological properties. In particular, the compounds possess interesting central nervous system activity. Thus, they possess the ability to reduce conflict without at the same time exhibiting the depressant or stimulating properties generally associated with compounds that affect the central nervous system. They also possess activity as anti-ulcer agents which is demonstrated by their inhibition of ulceration in the Shay rat. In addition, the present compounds possess activity as pepsin-inhibitors and hypotensive agents. Furthermore, they possess anti-algal activity against the organism *Chlorella vulgaris*; they also inhibit germination of seeds of Trifolium.

The compounds which constitute this invention and their preparation will appear more fully from a consideration of the following examples which are given for the purpose of illustration only and are not to be construed as limiting the invention in spirit or in scope. In these examples, quantities are indicated in parts by weight and temperatures in degrees centigrade (° C.).

*Example 1*

To a suspension of 232 parts of 2-chlorothioxanthene in 1400 parts of ether is added, with stirring, a solution of 70 parts of butyl lithium in heptane. The resultant solution is refluxed for 3 hours and poured into a slurry of Dry Ice and ether. This mixture is allowed to stand for 15 hours and then potassium hydroxide solution is added to dissolve the precipitated carboxylic acid salt. The aqueous layer is separated and acidified with hydrochloric acid. The solid which precipitates is separated and recrystallized from 2-propanol to give 2-chloro-9-thioxanthenecarboxylic acid melting at about 225–227° C.

*Example 2*

A suspension of 15 parts of 9-thioxanthenecarboxylic acid in 130 parts of dry toluene is heated to reflux and 11.9 parts of thionyl chloride is added. The resultant mixture is refluxed for 2 hours and the solvent and excess thionyl chloride are removed under reduced pressure. Addition of hexane to the residue causes it to crystallize. This solid is 9-thioxanthenecarbonyl chloride and it is used without further purification.

In the same manner, 2-chloro-9-thioxanthenecarboxylic acid is converted to 2-chloro-9-thioxanthenecarbonyl chloride and 9,10-dihydro-9-anthracenecarboxylic acid is converted to 9,10-dihydro-9-anthracenecarbonyl chloride.

Example 3

A mixture of 46 parts of 2-chlorobenzhydryl chloride, 50 parts of piperazine, 30 parts of potassium carbonate, 3 parts of sodium iodide and 480 parts of butanone is stirred and refluxed for 48 hours. The reaction mixture is filtered and the solvent is evaporated from the filtrate. The residue is distributed between benzene and water and the benzene layer is separated and washed with water. It is then extracted twice with 3 N hydrochloric acid and the acid extract is washed with benzene, alkalized, and extracted with benzene. The benzene solution is washed and dried and the solvent is evaporated to give 1-(2-chlorobenzhydryl)piperazine.

Example 4

To a solution of 114 parts of 1-(3-methylbenzyl)piperazine in 350 parts of water and 125 parts of concentrated hydrochloric acid, there is added with stirring a solution of 43 parts of sodium nitrite in 100 parts of water. The resultant mixture is stirred at 50° for 3 hours, it is made alkaline with potassium carbonate and potassium hydroxide solution, and it is then extracted with chloroform. The resultant solution is dried and treated with charcoal and the solvent is removed under reduced pressure to give an oil which is 1-(3-methylbenzyl)-4-nitrosopiperazine.

If an equivalent quantity of the appropriate piperazine is substituted for the 1-(3-methylbenzyl)piperazine and the above procedure is repeated, the following compounds are obtained:

1-ethyl-4-nitrosopiperazine.
1-(2-hydroxyethyl)-4-nitrosopiperazine.
1-(4-hydroxybutyl)-4-nitrosopiperazine.
1-(4-methylbenzyl)-4-nitrosopiperazine.
1-benzhydryl-4-nitrosopiperazine, melting at about 110–111° C.
1-(2-chlorobenzhydryl)-4-nitrosopiperazine, melting at about 117–119° C.
1-(4-chlorobenzhydryl)-4-nitrosopiperazine, melting at about 121–123° C.

Example 5

To a mixture of 58 parts of 1-nitrosopiperazine and 70 parts of potassium carbonate in 400 parts of 2-butanone is added, with stirring, a solution of 81 parts of 4-chlorobenzyl chloride in 160 parts of 2-butanone. The resultant mixture is stirred for 16 hours, 5 parts of sodium iodide is added, and the resultant mixture is refluxed for 4 hours. The resultant mixture is filtered and the solvent is removed from the filtrate to give an oil which crystallizes on standing. This product is 1-(4-chlorobenzyl)-4-nitrosopiperazine.

Equivalent quantities of the appropriate benzyl chloride are substituted for the 4-chlorobenzyl chloride and the above procedure is repeated. The following compounds are obtained in this way:

1-(4-methoxybenzyl)-4-nitrosopiperazine.
1-(3-fluorobenzyl)-4-nitrosopiperazine.
1-(4-bromobenzyl)-4-nitrosopiperazine.

Example 6

To a solution of 15.5 parts of lithium aluminum hydride in 1060 parts of ether is added with stirring a solution of 85 parts of 1-(3-methylbenzyl)-4-nitrosopiperazine in 210 parts of ether. The resultant mixture is refluxed for 2 hours and then stirred at room temperature for 16 hours. The resultant mixture is decomposed by the successive addition of 16 parts of water, 12.2 parts of 20% aqueous sodium hydroxide solution, and 57 parts of water. The mixture is filtered to remove the precipitated solids and the filtrate is distilled to give 1-amino-4-(3-methylbenzyl(piperazine boiling at about 124–126° C. at 1 mm. pressure.

In a similar manner, reduction of 92 parts of 1-(4-chlorobenzyl)-4-nitrosopiperazine with 15.2 parts of lithium aluminum hydride gives 1-amino-4-(4-chlorobenzyl)piperazine boiling at about 128–132° C. at 0.3 mm. pressure. This compound crystallizes on standing.

1-amino-4-(4-methylbenzyl)piperazine is also obtained from 1-(4-methylbenzyl)-4-nitrosopiperazine in the same manner.

Example 7

A solution of 116 parts of 1-(4-methoxybenzyl)-4-nitrosopiperazine in 840 parts of tetrahydrofuran is added to a refluxing solution of 23 parts of lithium aluminum hydride in 1400 parts of tetrahydrofuran. When the addition is complete, the mixture is stirred for one hour, refluxed for 4 hours, and then stirred for 16 hours at room temperature. The product is then isolated from the reaction mixture by the procedure described in the first paragraph of Example 6 to give 1-amino-4-(4-methoxybenzyl)piperazine melting at about 74–77° C.

If the above reduction is repeated using the appropriate nitroso compound, the following compounds are obtained:

1-amino-4-ethylpiperazine.
1-amino-4-(2-hydroxyethyl)piperazine, melting at about 103–105° C.
1-amino-4-(4-hydroxybutyl)piperazine.
1-amino-4-(3-fluorobenzyl)piperazine.
1-amino-4-(4-bromobenzyl)piperazine.
1-amino-4-benzhydrylpiperazine, melting at about 106–109° C.
1-amino-4-(2-chlorobenzhydryl)piperazine.
1-amino-4-(4-chlorobenzhydryl)piperazine, melting at about 116–121° C.

Example 8

With stirring, a solution of 11.5 parts of 1-amino-4-methylpiperazine in 45 parts of chloroform is added to a solution of 24.4 parts of 9-xanthenecarbonyl chloride and 325 parts of chloroform. The resultant mixture is refluxed for 6 hours and then allowed to stand for 16 hours. During this time, a precipitate forms. It is filtered, washed with chloroform and ether, and then dissolved in water. The aqueous solution is made alkaline with potassium carbonate whereupon the free base precipitates. The resultant mixture is extracted with chloroform and the chloroform extract is dried. Evaporation of the solvent from the chloroform solution gives N-(4-methyl-1-piperazinyl)-9-xanthenecarboxamide. Upon recrystallization from methanol, this product melts at about 258–263° C. with decomposition.

In a similar manner, reaction of 1-amino-4-ethylpiperazine with 9-xanthenecarbonyl chloride gives N-(4-ethyl-1-piperazinyl)-9-xanthenecarboxamide. This compound has the following formula

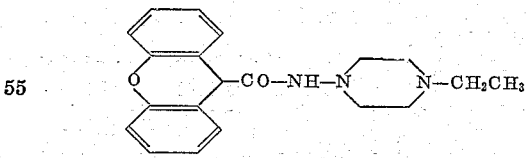

Example 9

To a solution of 15.1 parts of 1-amino-4-(4-chlorobenzhydryl)piperazine in 150 parts of chloroform is added a solution of 12.2 parts of 9-xanthenecarbonyl chloride in 37 parts of chloroform. The resultant mixture is refluxed for 4 hours. The precipitate which forms is separated by filtration and suspended in a mixture of sodium hydroxide solution in chloroform. The chloroform layer is separated and dried and the solvent is evaporated. The residue is crystallized from 2-propanol to give N-[4-(4-chlorobenzhydryl)-1-piperazinyl]-9-xanthenecarboxamide, melting at about 185–188° C.

In a similar manner, 1-amino-4-benzhydrylpiperazine is reacted with 9-xanthenecarbonyl chloride to give N-(4-benzhydryl-1-piperazinyl)-9-xanthenecarboxamide. Crystallization of this compound from ethanol gives the hemiethanolate melting at about 247–250° C.

1-amino-4-(2-chlorobenzhydryl)piperazine is likewise reacted with 9-xanthenecarbonyl chloride to give N-[4-(2-chlorobenzhydryl) - 1 - piperazinyl] - 9 - xanthenecarboxamide.

*Example 10*

A mixture of 11 parts of 1-amino-4-(4-methoxybenzyl)piperazine and 12.2 parts of 9-xanthenecarbonyl chloride and 300 parts of chloroform is refluxed for 4 hours. The resultant mixture is allowed to stand for 16 hours. The mixture is filtered and the filtrate is washed with sodium hydroxide solution and dried and the solvent is removed to leave a solid residue. This residue is recrystallized from ethanol to give N-[4-(4-methoxybenzyl) - 1 - piperazinyl]-9-xanthenecarboxamide melting at about 213–216° C. with decomposition. This compound has the following formula

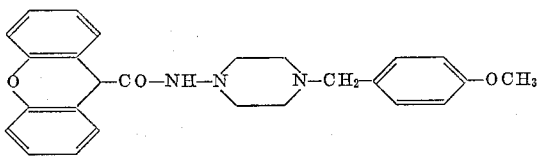

*Example 11*

6.9 parts of 1-amino-4-methylpiperazine is dissolved in dry toluene, and a solution of 7.8 parts of 9-thioxanthenecarbonyl chloride in dry toluene is added. The resultant mixture is refluxed for 4 hours and filtered to remove the precipitate. The filtered precipitate and an acid extract of the filtrate are combined and the mixture is made alkaline with potassium carbonate. The resultant aqueous mixture is extracted with chloroform and the solvent is evaporated from the dry chloroform layer to give N-(4-methyl-1 - piperazinyl)-9-thioxanthenecarboxamide. This compound melts at about 218–220° C. after recrystallization from ethanol.

In a similar manner, 1-amino-4-methylpiperazine is reacted with 9-fluorenecarbonyl chloride to give N-(4-methyl-1-piperazinyl)-9-fluorenecarboxamide melting at about 250–252° C. after recrystallization from ethyl alcohol. In this case, benzene is the reaction solvent.

If 1-amino-4-methylpiperazine is reacted with 9,10-dihydro-9-anthracenecarbonyl chloride in the manner described in the first paragraph, the product is N-(4-methyl-1 - piperazinyl) - 9,10-dihydro-9-anthracenecarboxamide melting at about 223–225° C. after recrystallization from ethyl alcohol.

*Example 12*

To a solution of 12 parts of 1-amino-4-benzyl-piperazine in benzene is added a solution of 6.85 parts of 9-fluorenecarbonyl chloride in benzene. The resultant mixture is filtered to remove the precipitate which is then suspended in water. Then, solid potassium carbonate is added to the aqueous suspension to give an alkaline mixture which is extracted with chloroform. The chloroform layer is dried and the solvent is evaporated to give crude N-(4-benzyl-1-piperazinyl)-9-fluorenecarboxamide. After recrystallization from ethanol, this compound melts at about 222–228° C. with decomposition.

In a similar manner, 12.0 parts of 1-amino-4-benzyl-piperazine is reacted with 9,10-dihydro-9-anthracenecarbonyl chloride to give N-(4-benzyl-1-piperazinyl)-9,10-dihydro-9-anthracenecarboxamide. Here, toluene is used as the reaction solvent. This product melts with decomposition at about 209–211° C. after recrystallization from ethanol.

*Example 13*

A solution of 9.7 parts of 9-xanthenecarbonyl chloride in toluene is added to a solution of 16.4 parts of 1-amino-4-(3-methylbenzyl)piperazine in dry toluene. The resultant mixture is refluxed for 5 hours. The mixture is filtered to remove the precipitate which is combined with an acid extract of the filtrate. Solid potassium carbonate (enough to alkalize the solution) is added to the aqueous suspension and the resultant mixture is extracted with chloroform. The solvent is evaporated from the dry chloroform solution to give N-[4-(3-methylbenzyl)-1-piperazinyl]-9-xanthenecarboxyamide melting at about 228–229° C. after recrystallization from ethanol.

If an equivalent quantity of 1-amino-4-(4-methylbenzyl)piperazine is substituted for the 1-amino-4-(3-methylbenzyl)piperazine and the above procedure is repeated, the product is N-[4-(4-methylbenzyl)-1-piperazinyl]-9-xanthenecarboxamide. This compound has the following formula

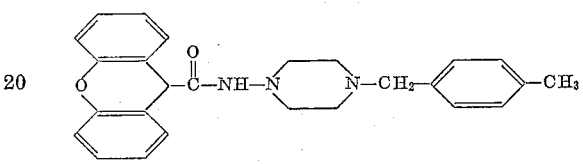

*Example 14*

To a solution of 11.3 parts of 1-amino-4-(4-chlorobenzyl)piperazine in dry toluene is added with stirring 6.1 parts of 9-xanthenecarbonyl chloride in dry toluene. The resultant mixture is refluxed for 5 hours before it is filtered to remove the precipitated solid. This solid suspended in water and solid potassium carbonate is added to give an alkaline mixture. The resultant mixture is extracted with chloroform and the solvent is evaporated from the dry chloroform layer. This gives N-[4-(4-chlorobenzyl) - 1-piperazinyl]-9-xanthenecarboxyamide, melting at about 235–236° C. after recrystallization from ethanol.

If an equivalent quantity of the appropriate acid chloride is substituted for the 9-xanthenecarbonyl chloride and the above procedure is repeated, the following compounds are obtained:

N-[4-(4-chlorobenzyl)-1-piperazinyl] - 9,10-dihydro-9-anthracenecarboxamide melting at about 216–218° C.

N-[4-(4-chlorobenzyl)-1-piperazinyl] - 9-thioxanthenecarboxamide melting at about 202–204° C.

N-[4-(4-chlorobenzyl) - 1-piperazinyl]-2-chloro-9-thioxanthenecarboxamide melting at about 192–194° C.

*Example 15*

If an equivalent quantity of the appropriate 1-aminopiperazine is substituted for the 1-amino-4-(4-chlorobenzyl)piperazine and the procedure of Example 14 is repeated, the following compounds are obtained:

N-[4-(3-fluorobenzyl)-1-piperazinyl]-9-xanthenecarboxamide.

N-[4-(4-bromobenzyl)-1-piperazinyl] - 9 - xanthenecarboxamide.

*Example 16*

To a mixture of 8 parts of 1-amino-4-(2-hydroxyethyl)piperazine in 12 parts of triethylamine and 225 parts of chloroform is added a solution of 29.4 parts of 9-xanthenecarbonyl chloride in 123 parts of chloroform with stirring. The resultant mixture is refluxed for 30 minutes and the chloroform solvent is evaporated under reduced pressure. The residue is suspended in potassium carbonate solution and the resultant mixture is extracted with chloroform. The solvent is evaporated from the chloroform solution to give crude 1-(9-xanthenecarboxamido)-4 - [2 - (9-xanthenecarboxy)ethyl]piperazine. A mixture of .6 part of potassium hydroxide and 5 parts of the ester-hydrazide is heated in dimethylformamide for 2 hours. The resultant mixture is poured into ice-water and the solid which precipitates is crystallized from absolute ethanol to give N-[4-(2-hydroxyethyl)-1-piperazinyl]-9-xanthenecarboxamide melting at about 238–240° C. The product has the following formula

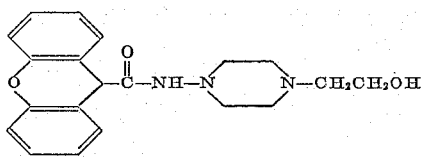

An equivalent quantity of 9,10-dihydro-9-anthracenecarbonyl chloride is substituted for the 9-xanthenecarbonyl chloride and the above procedure is repeated. However, the above procedure is modified to use ethyl alcohol in place of dimethylformamide as the solvent for saponification of the ester-hydrazide. The product is N-[4-(2-hydroxyethyl)-1-piperazinyl] - 9,10 - dihydro-9-anthracenecarboxamide melting at about 205–206° C. after recrystallization from alcohol.

1-amino-4-(4-hydroxybutyl)piperazine is reacted with 9-xanthenecarbonyl chloride according to the procedure described in the first paragraph to give N-[4-(4-hydroxybutyl)-1-piperazinyl]-9-xanthenecarboxamide.

*Example 17*

To a solution of 20.3 parts of 1-amino-4-(2-hydroxyethyl)piperazine in 300 parts of chloroform is added a solution of 18 parts of dibenzo[a,d]cycloheptadiene-5-carbonyl chloride in 70 parts of methylene chloride. The resultant mixture is then stirred for 2 hours and allowed to stand for 15 hours. The mixture is filtered and the filtrate is extracted twice with 1 N hydrochloric acid. The combined acid extracts are washed with ether and made alkaline with potassium hydroxide solution. Extraction of the alkaline mixture with chloroform gives a solution which is then dried over potassium carbonate, filtered, and concentrated to give an oily paste. This residue is dissolved in a solution made up from 2 parts of potassium hydroxide and 120 parts of ethanol and refluxed for 1 hour. The resultant mixture is then poured into ice water and potassium carbonate and extracted with chloroform. The chloroform solution is dried, the solvent is evaporated, and the residue is dissolved in ethyl acetate together with oxalic acid. The crystalline product which separates is then recrystallized from ethanol to give N - [4-(2-hydroxyethyl)-1-piperazinyl] - dibenzo [a,-d]cycloheptadiene-5-carboxamide oxalate hemiethanolate melting at about 178–181° C. with decomposition. The free base has the following formula

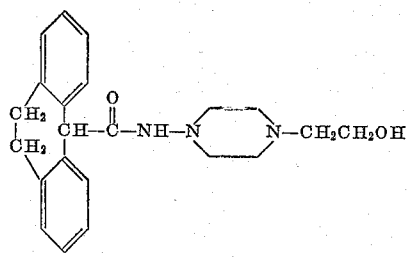

*Example 18*

A solution of 13 parts of 9-thioxanthenecarbonyl chloride and 60 parts of toluene is added to 14.5 parts of 1-amino-4-(2-hydroxyethyl)piperazine in 150 parts of chloroform. The resultant mixture is refluxed for 2 hours and filtered. The insoluble solid is dissolved in 1 N hydrochloric acid and combined with a hydrochloric acid extract of the filtrate. The aqueous solution is alkalized with potassium carbonate and the free base which precipitates is separated and recrystallized from absolute ethanol to give N-[4-(2-hydroxyethyl)-1-piperazinyl]-9-thioxanthenecarboxamide melting at about 209–211° C. with decomposition.

If 2-chloro-9-thioxanthenecarbonyl chloride is substituted for the 9-thioxanthenecarbonyl chloride and the above procedure is repeated, the product is N-[4-(2-hydroxyethyl) - 1-piperazinyl] - 2-chloro-9-thioxanthenecarboxamide. After recrystallization from acetonitrile, this compound melts at about 195–198° C. with decomposition.

*Example 19*

If 9.6 parts of 1-amino-4-benzylpiperazine is reacted with 12.2 parts of 9-xanthenecarbonyl chloride according to the procedure described in Example 9, the product obtained is N-(4-benzyl-1-piperazinyl)-9-xanthenecarboxamide melting at about 220–222° C. after recrystallization from ethyl acetate. This compound has the following formula

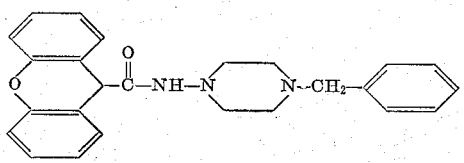

What is claimed is:
1. A compound of the formula

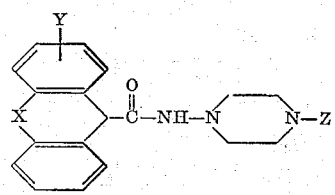

wherein X is selected from the group consisting of a bond connecting the two aromatic rings, alkylene of less than three carbon atoms, and an element of periodic group VI of an atomic weight less than 40; Y is selected from the group consisting of hydrogen and chlorine; and Z is selected from the group consisting of lower alkyl, hydroxy(lower alkyl), benzyl,

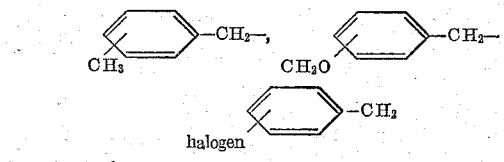

benzhydryl, and

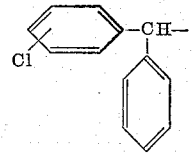

2. A compound of the formula

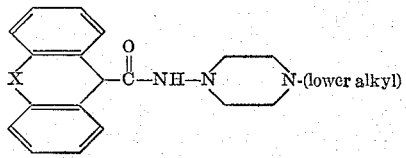

wherein X is an element of the periodic group VI, of an atomic weight less than 40.
3. N-(4-methyl-1-piperazinyl)-3-xanthenecarboxamide.
4. A compound of the formula

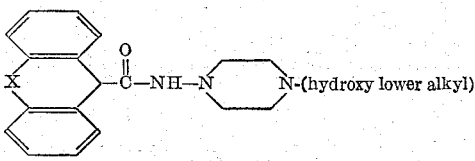

wherein X is an element of the periodic group VI, of an atomic weight less than 40.

5. N-[4-(2-hydroxyethyl)-1-piperazinyl] - 9 - xanthene-carboxamide.

6. A compound of the formula

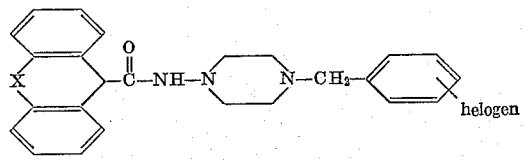

wherein X is an element of the periodic group VI, of an atomic weight less than 40.

7. N-[4-(-chlorobenzyl)-1-piperazinyl] 9 - xanthene-carboxamide.

8. N-(4-benzyl-1-piperazinyl) - 9-xanthenecarboxamide.

9. A compound of the formula

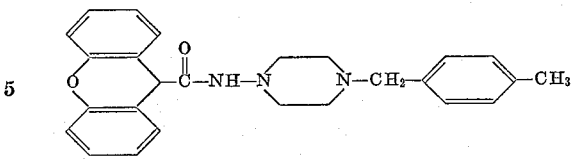

10. N-[4-(3-methylbenzyl)-1-piperazinyl]-9-xanthene-carboxamide.

11. N-[4-(4-methoxybenzyl)-1-piperazinyl]-9-xanthene-carboxamide.

No references cited.

NICHOLAS S. RIZZO, *Primary Examiner.*

UNITED STATES PATENT OFFICE
CERTIFICATE OF CORRECTION

Patent No. 3,200,120                  August 10, 1965

Calvin H. Lovell

It is hereby certified that error appears in the above numbered patent requiring correction and that the said Letters Patent should read as corrected below.

Column 3, line 72, for "methylbenzyl(piperazine" read -- methylbenzyl)piperazine --; column 5, line 54, for "benzyl-piperazine" read -- benzylpiperazine --; column 6, lines 8 and 37, for "-xanthenecarboxyamide" , each occurrence, read -- -xanthenecarboxamide --; line 39, for "chlo" read -- chlo- --; column 8, lines 40 to 43, the second formula should appear as shown below instead of as in the patent:

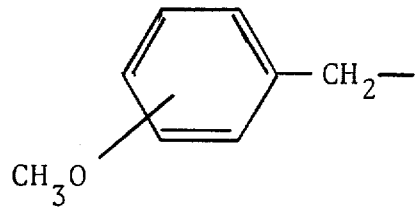

line 65, for "-3-" read -- -9- --; column 9, line 13, for "N-[4-(-chlorobenzyl)-1-piperazinyl] 9-" read -- N-[4-(4-chlorobenzyl)-1-piperazinyl]-9- --.

Signed and sealed this 16th day of August 1966.

(SEAL)
Attest:

ERNEST W. SWIDER                          EDWARD J. BRENNER
Attesting Officer                       Commissioner of Patents